US 12,181,612 B2

(12) United States Patent
Van Den Broeck

(10) Patent No.: US 12,181,612 B2
(45) Date of Patent: Dec. 31, 2024

(54) OPTICAL SENSOR DIAGNOSTICS

(71) Applicant: Melexis Technologies NV, Tessenderlo (BE)

(72) Inventor: Hans Van Den Broeck, Tessenderlo (BE)

(73) Assignee: MELEXIS TECHNOLOGIES NV, Tessenderlo (BE)

(*) Notice: Subject to any disclaimer, the term of this patent is extended or adjusted under 35 U.S.C. 154(b) by 933 days.

(21) Appl. No.: 17/203,382

(22) Filed: Mar. 16, 2021

(65) Prior Publication Data
US 2021/0293941 A1 Sep. 23, 2021

(30) Foreign Application Priority Data

Mar. 20, 2020 (EP) .................................. 20164463

(51) Int. Cl.
G01S 7/48 (2006.01)
G01S 7/497 (2006.01)
G01S 17/08 (2006.01)
H04N 13/204 (2018.01)
H04N 17/00 (2006.01)
H04N 13/00 (2018.01)

(52) U.S. Cl.
CPC .............. G01S 7/497 (2013.01); G01S 17/08 (2013.01); H04N 13/204 (2018.05); H04N 17/002 (2013.01); H04N 2013/0081 (2013.01)

(58) Field of Classification Search
USPC ....................................................... 356/4.01
See application file for complete search history.

(56) References Cited

U.S. PATENT DOCUMENTS

| 9,019,410 | B2* | 4/2015 | Lim | ...................... H04N 25/59 257/292 |
| 9,560,296 | B2* | 1/2017 | Hseih | .................... H04N 25/589 |
| 10,728,537 | B2* | 7/2020 | Itoh | ........................ G03B 35/08 |
| 11,215,425 | B2* | 1/2022 | Gagel | ........................ G01J 5/00 |
| 2013/0141619 | A1 | 6/2013 | Lim et al. | |
| 2019/0230347 | A1 | 7/2019 | Itoh et al. | |
| 2019/0249956 | A1 | 8/2019 | Gagel | |

FOREIGN PATENT DOCUMENTS

DE 102018003890 A1 11/2019

OTHER PUBLICATIONS

Communication Pursuant to Article 94(3) EPC from Corresponding European Patent Application No. EP20164463.0, Mar. 20, 2024.
Search Report from corresponding EP Application No. EP20164463.0, Sep. 10, 2020.

* cited by examiner

Primary Examiner — James R Hulka
(74) Attorney, Agent, or Firm — Workman Nydegger

(57) ABSTRACT

A method for diagnosing an optical sensor includes a photodetector and an integrator. The method comprises exposing the photodetector to incoming light; obtaining an initial integrated signal at an initial frame; at least once executing the steps of changing at least one control parameter of the optical sensor, exposing the photodetector to incoming light, and obtaining one or more subsequent integrated signals at a subsequent frame; obtaining a characteristic of the optical sensor from the obtained integrated signals; comparing the obtained characteristic with a predetermined characteristic of the optical sensor to diagnose the optical sensor.

15 Claims, 5 Drawing Sheets

OPTICAL SENSOR DIAGNOSTICS

FIELD OF THE INVENTION

The invention relates to the field of optical sensors. More specifically it relates to a method and system for diagnosing an optical sensor.

BACKGROUND OF THE INVENTION

Optical sensors in general and image sensors (2D or 3D) in particular convert the amount of light into output values. The output values may for example be voltages or digital codes. When using these in safety-critical systems, diagnostic coverage is an important characteristic.

For the electrical part of such a sensor system the diagnostics can be added without significant impact. However, for the conversion part wherein incoming light is converted into an electrical value, adding diagnostics is not straightforward and often expensive.

This may for example be done by using an additional light source which is specifically used for diagnosing the optical sensor. This will, however, result in a complicated and expensive optical design. The operation of such a sensor is not continuous. For the diagnosis the additional light source needs to be switched on and monitored by the optical sensor to determine whether the optical sensor is still working. Hence, the frame rate of the optical sensor is sacrificed for the diagnostics. In image sensors typically not all pixels are covered by such a diagnostics system.

In some prior art systems diagnostics is implemented by providing a redundant optical system. In that case an additional optical sensor is used to verify the operation of the other one. Implementing redundancy, however, does significantly increase the cost and complexity.

Alternatively, in some systems software algorithms are used to detect failures. Such systems are typically non-deterministic in the sense of predictability or coverage.

There is therefore a need for good methods and systems for diagnosing optical sensors which are less complex than a redundant system.

SUMMARY OF THE INVENTION

It is an object of embodiments of the present invention to provide good methods and systems for diagnosing optical sensors.

The above objective is accomplished by a method and device according to the present invention.

In a first aspect embodiments of the present invention relate to a method for diagnosing an optical sensor which comprises a photodetector and an integrator.

The method comprises:
exposing the photodetector to incoming light,
obtaining an initial integrated signal at an initial frame,
at least once executing the steps of changing at least one control parameter of the optical sensor, exposing the photodetector to incoming light, and obtaining one or more subsequent integrated signals at a subsequent frame,
wherein integrated signals are obtained per frame, and a frame comprises at least one sequence of resetting the optical sensor and accumulating, during an integration time, a signal from circuitry which connects the photodetector with the integrator, and reading the integrated signal,
obtaining a characteristic of the optical sensor from the obtained integrated signals,
comparing the obtained characteristic with a pre-determined characteristic of the optical sensor, wherein the pre-determined characteristic is defined in function of the at least one control parameter, to diagnose the optical sensor.

It is an advantage of embodiments of the present invention that faults in the optical sensor can be detected by changing a control parameter of the optical sensor and by comparing the expected change of the integrated signal with the measured change of the integrated signal. One or more control parameters may be changed.

In embodiments of the present invention the predefined characteristic may comprise threshold values within which the obtained characteristics should fall. If this is not the case the method may be adapted for flagging a fault indicating an error in the optical sensor.

In embodiments of the present invention a period of resetting, accumulating and reading is referred to as a frame or sub-frame. Several sub-frames may be present in a macro-frame. The control parameter may be changed at macro-frame level or at sub-frame level. It may be randomly changed or it may be repetitively modulated.

It is an advantage of embodiments of the present invention that changes in the intensity of the incoming light, which may be falsely interpreted as a failure of the optical sensor, can be filtered out by using a plurality of integrated signals for obtaining the characteristics of the optical sensor.

It is an advantage of embodiments of the present invention that a diagnostics method can be run without affecting the frame rate of the optical sensor. This is for example not possible in prior art systems where an additional light source is used for diagnosing the optical sensor.

In embodiments of the present invention at least one control parameter is the integration time.

It is an advantage of embodiments of the present invention that the optical sensor can be diagnosed by changing the integration time. If, for a same intensity of incoming light, the accumulated signal does not change in correspondence with the change of the integration time this implies a malfunction of the optical sensor.

In embodiments of the present invention the integration times have a ratio ranging from 50% to 150%.

Changing the integration time as described above can be done within a certain range which is typically limited to 50%-150% of the original integration time. The integration time is on the low end limited by the minimal amount of sensitivity needed. When reducing the integration time to a too low value, the resulting pixel response might be too low for the application and the signal to noise ratio gets reduced to a level which is below acceptable. On the upper side the integration time is limited by the saturation. When the integration time is increased too much, pixels start saturating. This means a pixel output is limited for such a case by the output range and is no longer responsive to additional light. At this point in time the signal-to-noise ratio has a steep degradation.

In embodiments of the present invention the duration of the integration time may be limited such that during the integration period changes in the intensity of the incoming light are unlikely.

In embodiments of the present invention the time period for changing the control parameters of the optical sensor is thereby neglectable compared to the integration times.

In embodiments of the present invention at least one control parameter is the gain of the optical sensor.

In embodiments of the present invention the gain of the optical sensor is changed by changing the capacitance value of the integrator. The integrator may for example be a capacitor which comprises two or more parallel sub-capacitors. By connecting an additional sub-capacitor or by disconnecting a sub-capacitor, the total capacitance value can be changed.

In embodiments of the present invention the integrated signal $V_{out}$ (t) is modelled as $g*t+V_{offset}$, wherein g and $V_{offset}$ are characteristics of the optical sensor which are obtained from the obtained integrated signals.

In this equation the parameter g is a function of the incoming light and of the gain of the optical sensor. The gain can be changed by changing the capacitance value of the integrator. The parameter t is the integration time.

In embodiments of the present invention a characteristic of the optical sensor is obtained by dividing subsequent integrated signals.

This result may for example be compared with a pre-determined characteristic to determine whether the optical sensor is still functioning correctly.

In embodiments of the present invention where the integration time is changed, the ratio of subsequent integrated signals may be compared with the ratio of the integration times.

In embodiments of the present invention where the capacitance value is changed the ratio of the integrated signals may be compared with the inverse ratio of the capacitance values to determine whether the optical sensor is still functioning properly.

In a second aspect embodiments of the present invention relate to an optical sensor. The optical sensor comprises a photodetector, an integrator, and circuitry connecting the photodetector with the integrator such that a signal from the photodetector, or a processed version thereof, can be accumulated on the integrator. The optical sensor, moreover, comprises a controller configured for:
  obtaining an initial integrated signal at an initial frame,
  at least once executing the steps of changing at least one control parameter of the optical sensor, and obtaining one or more subsequent integrated signals at a subsequent frame,
  wherein integrated signals are obtained per frame, and a frame comprises at least one sequence of resetting the optical sensor and accumulating, during an integration time, a signal from the circuitry which connects the photodetector with the integrator, and reading the integrated signal,
  obtaining a characteristic of the optical sensor from the obtained integrated signals,
  comparing the obtained characteristic with a pre-determined characteristic of the optical sensor, wherein the pre-determined characteristic is defined in function of the at least one control parameter, to diagnose the optical sensor.

In embodiments of the present invention the integrator may be a capacitor.

In embodiments of the present invention the integrator may comprise a plurality of parallel capacitors wherein the controller is configured for connecting or disconnecting one or more of the capacitors of the integrator.

In embodiments of the present invention the optical sensor comprising a gain transistor configured for connecting or disconnecting a capacitor from the plurality of parallel capacitors of the integrator.

It is an advantage of embodiments of the present invention that the gain can be changed between frames and/or between sub-frames. This change in gain should be reflected in a change of the integrated signal and is used by the controller to trigger a fault diagnosis of the optical sensor.

In embodiments of the present invention the optical sensor comprises a reset transistor configured for resetting the integrator voltage.

In a third aspect embodiments of the present invention relate to a camera which comprises a plurality of pixels. Each pixel comprises a photodetector, an integrator, and circuitry connecting the photodetector with the integrator. The camera comprises a controller which is for each of the pixels configured for:
  obtaining an initial integrated signal at an initial frame,
  at least once executing the steps of changing at least one control parameter of the optical sensor, and obtaining one or more subsequent integrated signals at a subsequent frame,
  wherein integrated signals are obtained per frame, and a frame comprises at least one sequence of resetting the optical sensor and accumulating, during an integration time, a signal from the circuitry which connects the photodetector with the integrator, and reading the integrated signal,
  obtaining a characteristic of the optical sensor from the obtained integrated signals,
  comparing the obtained characteristic with a pre-determined characteristic of the optical sensor, wherein the pre-determined characteristic is defined in function of the at least one control parameter, to diagnose the optical sensor.

In embodiments of the present invention the camera is a 3D-camera and the controller is configured for obtaining a depth value for a pixel as characteristic of the pixel. Comparing the obtained characteristic with the predefined characteristic corresponds with verifying that the pixel depth does not significantly change for the different measurements.

In a fourth aspect embodiments of the present invention relate to an indirect Time-of-Flight system for measuring the time of flight of a modulated optical signal which is reflected on an object. The indirect Time-of-Flight system comprises an optical sensor according to embodiments of the present invention for receiving the reflected optical signal. The Time-of-Flight system is configured for obtaining a measure of the time-of-flight and this measure is the characteristic of the optical sensor for diagnosing the optical sensor.

In typical circumstances the time-of-flight is not significantly changing between measurements. Hence, the obtained measures of the time of flight should not significantly change between measurements, even when changing the control parameter of the optical sensor. In that case the pre-determined characteristic of the optical sensor is that the measure of the time-of-flight should remain substantially constant between measurements.

In embodiments of the present invention the circuitry connecting the photodetector with the integrator comprises a mixer configured for mixing a signal from the photodetector with a signal which is phase correlated with the modulated optical signal with such that the mixed signal can be accumulated on the integrator.

As the circuitry connecting the photodetector with the integrator comprises the mixer, the mixed signal (the signal from the photodetector mixed with the signal which is in phase with the modulated optical signal) will be accumulated on the integrator.

In a fifth aspect embodiments of the present invention relate to a computer program product for, if implemented on a processing unit, performing the method for diagnosing an optical sensor according to embodiments of the present invention.

Particular and preferred aspects of the invention are set out in the accompanying independent and dependent claims. Features from the dependent claims may be combined with features of the independent claims and with features of other dependent claims as appropriate and not merely as explicitly set out in the claims.

These and other aspects of the invention will be apparent from and elucidated with reference to the embodiment(s) described hereinafter.

Figure 1:
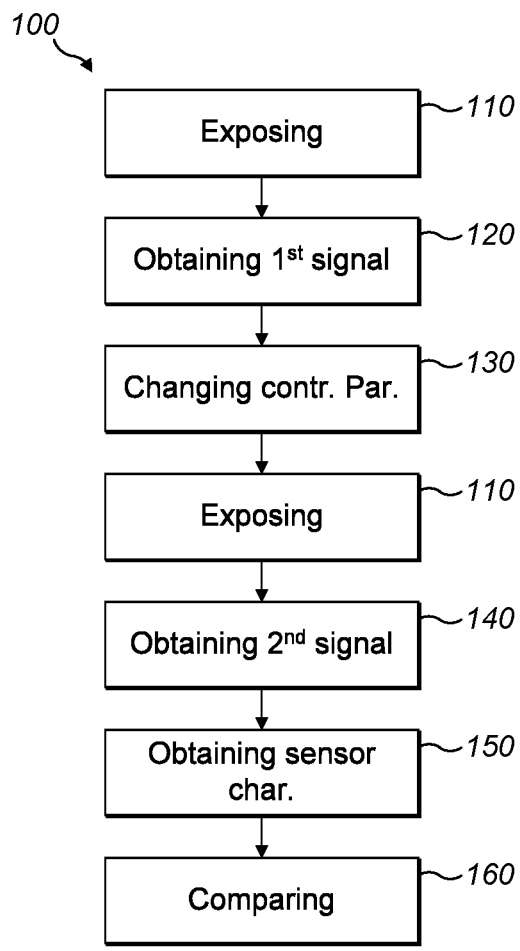
FIG. 1 shows a flow chart of a method in accordance with embodiments of the present invention.

Any reference signs in the claims shall not be construed as limiting the scope.

In the different drawings, the same reference signs refer to the same or analogous elements.

DETAILED DESCRIPTION OF ILLUSTRATIVE EMBODIMENTS

The present invention will be described with respect to particular embodiments and with reference to certain drawings but the invention is not limited thereto but only by the claims. The drawings described are only schematic and are non-limiting. In the drawings, the size of some of the elements may be exaggerated and not drawn on scale for illustrative purposes. The dimensions and the relative dimensions do not correspond to actual reductions to practice of the invention.

The terms first, second and the like in the description and in the claims, are used for distinguishing between similar elements and not necessarily for describing a sequence, either temporally, spatially, in ranking or in any other manner. It is to be understood that the terms so used are interchangeable under appropriate circumstances and that the embodiments of the invention described herein are capable of operation in other sequences than described or illustrated herein.

It is to be noticed that the term "comprising", used in the claims, should not be interpreted as being restricted to the means listed thereafter; it does not exclude other elements or steps. It is thus to be interpreted as specifying the presence of the stated features, integers, steps or components as referred to, but does not preclude the presence or addition of one or more other features, integers, steps or components, or groups thereof. Thus, the scope of the expression "a device comprising means A and B" should not be limited to devices consisting only of components A and B. It means that with respect to the present invention, the only relevant components of the device are A and B.

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment, but may. Furthermore, the particular features, structures or characteristics may be combined in any suitable manner, as would be apparent to one of ordinary skill in the art from this disclosure, in one or more embodiments.

Similarly it should be appreciated that in the description of exemplary embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the detailed description are hereby expressly incorporated into this detailed description, with each claim standing on its own as a separate embodiment of this invention.

Furthermore, while some embodiments described herein include some but not other features included in other embodiments, combinations of features of different embodiments are meant to be within the scope of the invention, and form different embodiments, as would be understood by those in the art. For example, in the following claims, any of the claimed embodiments can be used in any combination.

In the description provided herein, numerous specific details are set forth. However, it is understood that embodiments of the invention may be practiced without these specific details. In other instances, well-known methods, structures and techniques have not been shown in detail in order not to obscure an understanding of this description.

In a first aspect embodiments of the present invention relate to a method 100 for diagnosing an optical sensor which comprises a photodetector and an integrator. A flow chart of such a method is shown in FIG. 1. While exposing 110 the optical sensor to incoming light an initial integrated signal is obtained 120 and one or more subsequent integrated signals are obtained 140. Before obtaining the subsequent integrated signal one or more of the control parameters of the optical sensor are changed 130.

One or more sensor characteristics of the optical sensor are obtained 150 from the initial integrated signal and from the one or more subsequent integrated signals. The one or more control parameters of the optical sensor have an influence on the integrated signals. This influence can be pre-determined for the one or more control parameters. By comparing 160 the one or more pre-determined characteristics with the one or more obtained characteristics the optical sensor can be diagnosed. The influence of a control parameter on the integrated signal is stored in a pre-defined characteristic. This pre-defined characteristic is compared with a characteristic which is obtained when modifying the same control parameter.

Figure 2:
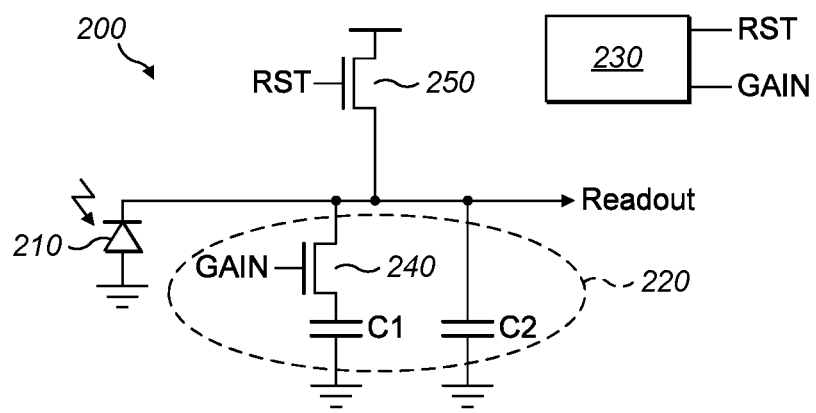
FIG. 2 shows a schematic drawing of an optical sensor in accordance with embodiments of the present invention.

In a second aspect embodiments of the present invention relate to an optical sensor 200. An exemplary embodiment of such an optical sensor in accordance with embodiments of the present invention is illustrated in FIG. 2. The optical sensor comprises a photodetector 210, an integrator 220, and circuitry connecting the photodetector 210 with the integrator 220 such that a signal from the photodetector, or a processed version of the signal, can be accumulated on the integrator. The optical sensor 200 comprises a controller 230. In embodiments of the present invention the controller may be a digital controller. It may for example be an FPGA controller, or it may be a processor on which a computer program is running configured for performing a method in accordance with embodiments of the present invention. The controller is configured for:
  obtaining an initial integrated signal at an initial frame,
  at least once executing the steps of changing at least one control parameter of the optical sensor, and obtaining one or more subsequent integrated signals at a subsequent frame,
  obtaining a characteristic of the optical sensor from the obtained integrated signals,
  comparing the obtained characteristic with a pre-determined characteristic of the optical sensor, wherein the pre-determined characteristic is defined in function of the at least one control parameter, to diagnose the optical sensor.

In embodiments of the present invention integrated signals are obtained per frame. A frame comprises at least one sequence of resetting the optical sensor and accumulating a signal from the photodetector. This signal is accumulated on the integrator. The frame also comprises reading the integrated signal. In embodiments of the present invention the accumulated signal may be representative for the amount of incoming light. The signal is accumulated during an integration time. Reading the integrated signal may for example be done by means of an AD converter which converts the voltage over the integrator into a digital signal which can be processed by the controller.

Figure 3:
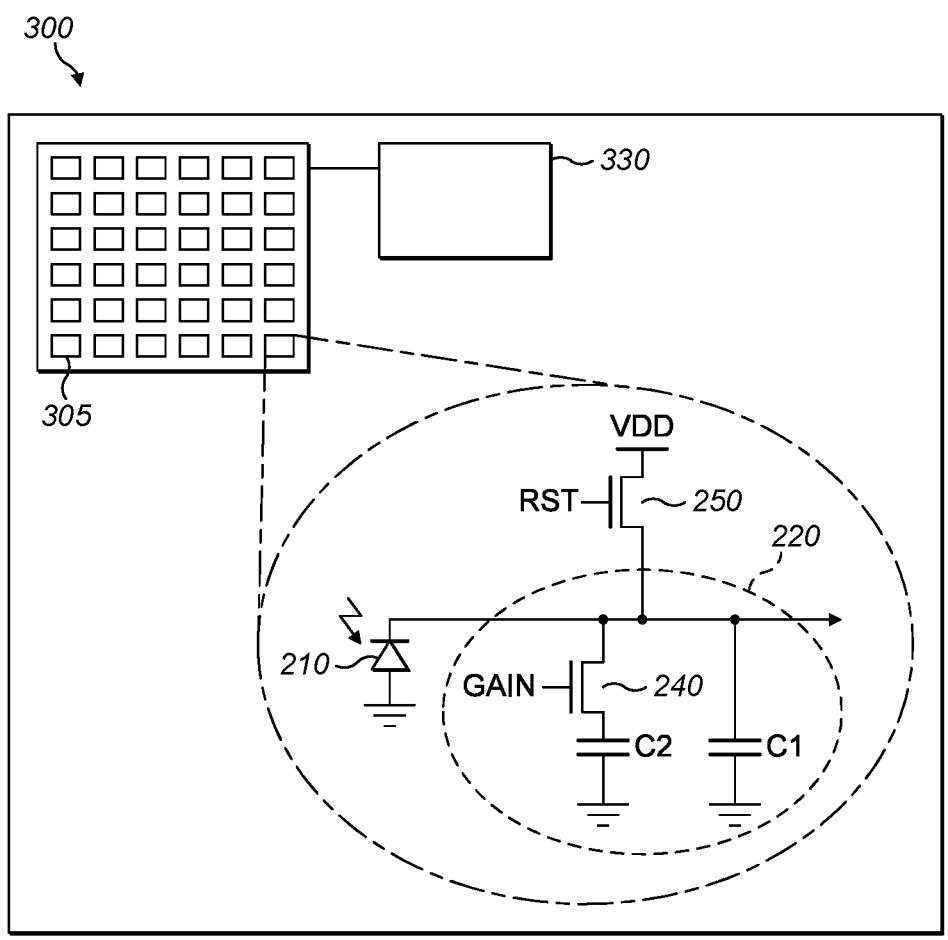
FIG. 3 shows a schematic drawing of a camera in accordance with embodiments of the present invention.

In a third aspect embodiments of the present invention relate to a camera 300 which comprises a plurality of pixels 305. An example thereof is illustrated in FIG. 3. Each pixel comprises a photodetector 210, an integrator 220, and circuitry connecting the photodetector 210 with the integrator 220 such that a signal from the photodetector, or a processed version thereof, can be accumulated on the integrator. The camera 300 comprises a controller 330. This controller 330 is configured for performing the following operations on each of the pixels:
  obtaining an initial integrated signal at an initial frame,
  at least once executing the steps of changing at least one control parameter of the optical sensor, and obtaining one or more subsequent integrated signals at a subsequent frame,
  obtaining a characteristic of the optical sensor from the obtained integrated signals,
  comparing the obtained characteristic with a pre-determined characteristic of the optical sensor, wherein the pre-determined characteristic is defined in function of the at least one control parameter, to diagnose the optical sensor.

A control parameter which may be modified is the integration time. In such embodiments the initial integration time (for obtaining the initial integration signal) and the subsequent integration time (for obtaining the subsequent integration signals) are different. The difference between the different integrated signals obtained with different integration times is used to check correct operation. The relation between output and integration time is predictable and can therefore be pre-defined. This pre-defined characteristic is used to diagnose the optical sensor. The diagnosis may comprise checking the correct operation of the optical sensor and/or derive major performance characteristics of the optical sensor (e.g. a pixel).

Figure 4:
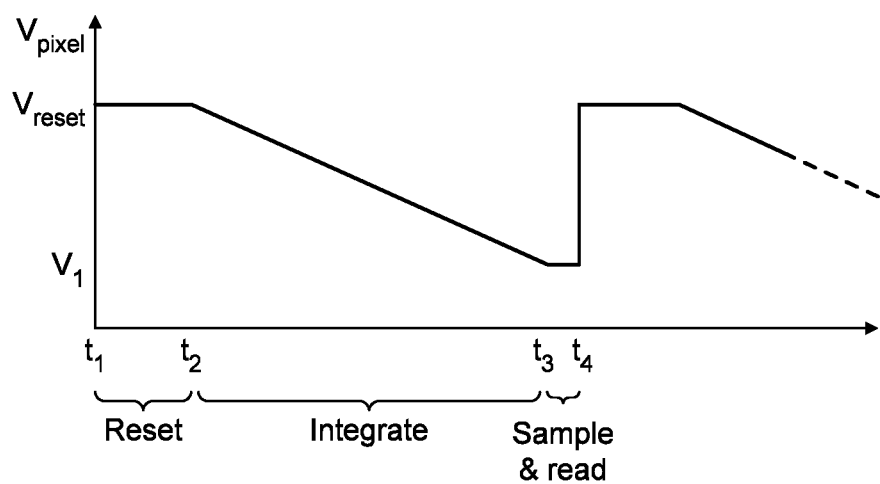
FIG. 4 shows the voltage of an optical sensor in function of time.

An example is illustrated in FIG. 4 which shows the voltage of an optical sensor in function of time. This optical sensor may for example be the sensor of a pixel of an image sensor. The optical sensor may for example be part of an indirect Time-of-Flight sensor. The optical sensor measures the light level incident on the pixel(s) during a certain amount of time (integration time).

In the example of FIG. 4 the pixel voltage is reset at the start of the frame (moment t1) to a known value. Next, during the period (t2-t3) the incoming light is changing the pixel voltage by creating a photo-induced current. After the integration time, the output level is sampled and read. Thus a first integrated signal is obtained. Typically $V_{reset}$-$V_1$ is outputted as value. This sequence is repeated for each frame whereby one frame corresponds with a period (t1-t4). The invention is related to repeating this cycle but with a different control parameter such as the gain and/or the integration time (t3-t2).

Figure 5:
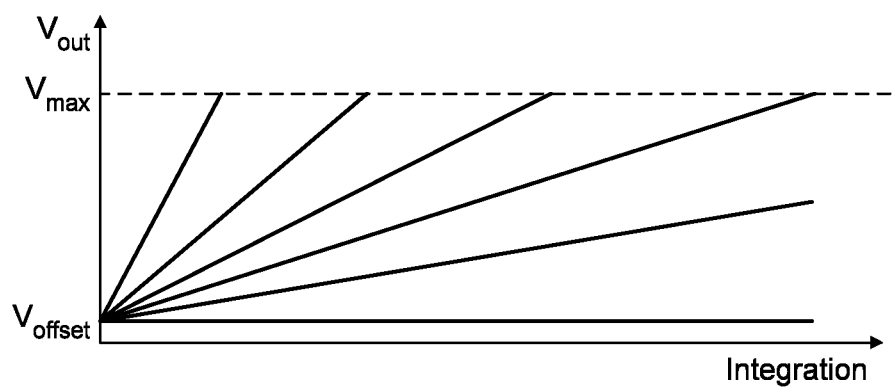
FIG. 5 shows the output voltage of an optical sensor in function of time for different light levels.

In the example, for a given pixel and sensor design, the output voltage $V_1$ at the end of an integration period depends on 2 variables. One is the incident light level. This will change the slope of the graph in FIG. 4 between t2-t3. The other one is the integration time. This is also shown in FIG. 5, where $V_{out}=(V_{reset}-V_1)$ is shown on the Y-axis. The different lines correspond to different light levels, with the line with the highest slope corresponding with the highest light level, and the horizontal line corresponding with the absence of incident light. On the X-axis the length of the integration time (t2-t3) is shown.

As can be seen in the graph in FIG. 5, for any given light level a linear relationship between the chosen integration time and the output voltage exists.

In one of the embodiments of this invention a pre-determined characteristic is the linear, predictable relationship between integration time and output value. This pre-determined characteristic is used to diagnose the optical sensor by comparing it with obtained characteristics. Diagnosing can for example include determining a performance characteristic of the optical sensor and/or determining correct operation of the sensor.

Figure 6:
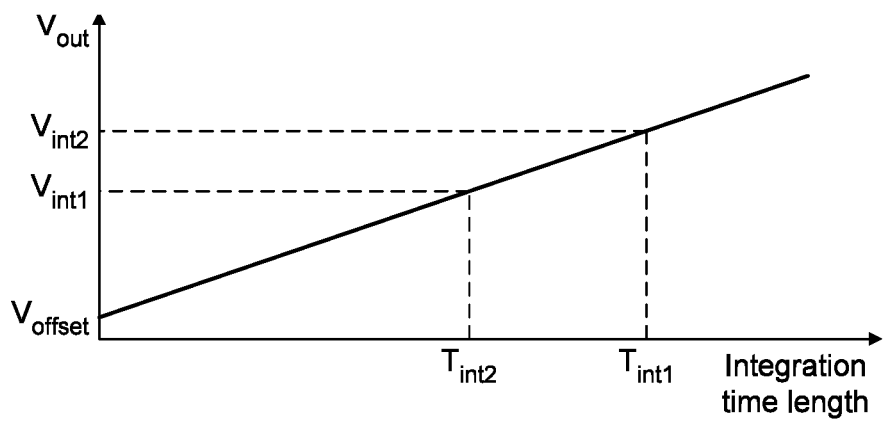
FIG. 6 shows a graph wherein the relation between the integration time and the output voltage is illustrated and wherein the output voltage is sampled for different integration times, in accordance with embodiments of the present invention.

To achieve this, in some embodiments of the present invention, the integration time is changed between frames. In the example of FIG. 6 two values for the integration time are used: $T_{int1}$ and $T_{int2}$ with $T_{int1}>T_{int2}$.

Sensor characteristics can be derived from the resulting voltages and the known time settings. One is the offset value. This offset value can be obtained for each individual pixel or sensor. It is the voltage which would be measured without incoming light. Another one is the pixel conversion gain. This conversion gain can also be obtained for each individual pixel or sensor.

These characteristics are characterizing the full input/output processing chain including the readout electronics, and as such allow a diagnostic of this full processing chain of the optical sensor (i.e. from the interface for the incident light to the interface where the output value can be measured.

In embodiments of the present invention the predefined characteristics may comprise threshold values within which the obtained characteristics should fall. These may be used to determine the performance or the correct behavior of the optical sensor. To diagnose a pixel, pre-set thresholds may be used as pass/fail criteria on the obtained characteristics. The pass/fail status may than be provided to the controller (e.g. to an application processor) to allow making correct decisions on the proper operation of the sensor.

Additionally, the obtained characteristics themselves or processed versions thereof can be outputted to the controller to allow external tracking of the performance and status. In this case the controller makes the pass/fail decision(s).

Figure 7:
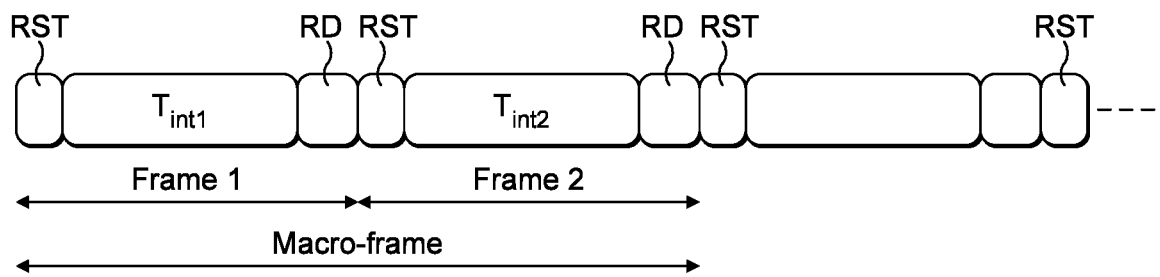
FIG. 7 shows a schematic drawing of a sequence of frames which are toggling between two integration times, in accordance with embodiments of the present invention.

In its most basic operation, a method according to embodiments of the present invention is toggling between two integration times. This is illustrated in FIG. 7. Each frame in this figure comprises a reset step, an integrating step, and a reading step. The obtained output values (i.e. the integrated signals) of each of the individual frames can be outputted and used in the controller, thus not sacrificing the frame rate of the system. In embodiments of the present invention one frame may be taken as reference (e.g. Frame 1), and the output values of the second frame may be adjusted based on the ratio of the integration times by using the pre-determined characteristic which expresses the expected relationship between the integration time and the output value. Thus, a characteristic can be obtained which is independent of the integration time.

The adjusting may for example be done as follows e.g. for a pixel of a camera. When the pixel which has a response of 100 lsb for an integration time in frame 1 which is 1000 μs, it is expected to have a result of 120 lsb for 1200 μs integration time in frame 2. Correcting the results for frame 2 would be done by multiplying by $T_{int1}/T_{int2}$, resulting in a corrected pixel output for frame 2 of 100 lsb.

For each pixel (or for a group of pixels) the ratio between $V_{out}$ of frame 1 and $V_{out}$ of frame 2 can be evaluated and tracked. This value corresponds with the gain for a certain intensity of the incoming light. This gain may be used as obtained characteristic and compared with a pre-determined characteristic. When a pixel (or group of pixels) no longer has results within the expected boundaries (for the gain), they can be flagged as faulty.

In embodiments of the present invention filtering may be applied on the obtained characteristics before comparing them with a pre-defined characteristic. Assuming, for example, the values used in the example above, the corrected pixel value of frame 2 can be compared to the pixel value of frame 1. If the result deviates above a pre-set threshold, it can be flagged as out of bounds. This decision can be made based on just 2 frames as in this example or a longer term trend could be filtered.

In embodiments of the present invention the integrated signal $V_{out}(t)$ can be modelled as $g*t+V_{offset}$, wherein g is the gain (for a fixed light intensity) and $V_{offset}$ are characteristics of the optical sensor. By changing the integration time from $T_{int1}$ to $T_{int2}$ two points $(T_{int1}, V_{out1})$ and $(T_{int2}, V_{out2})$ can be obtained and the linear relationship $V_{out}(t)=gain*t+V_{offset}$ can be derived. This allows to determine the gain and inherent offset of a pixel or sensor and compare those with predetermined values of the sensor for diagnostic reasons.

Figure 8:
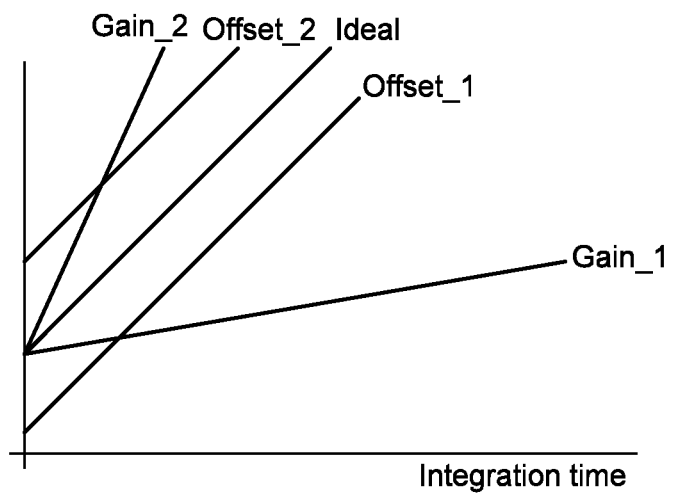
FIG. 8 shows curves of the output voltage in function of time for different offset values and gains to illustrate the use of offset and gain characteristics in accordance with embodiments of the present invention.

One way this can be done is by analyzing the output images for both captures and calculate the gain and offset for each pixel of the camera. By averaging this value over time, deviations can be detected. Possible deviations are pixels for which the gain drops (non-responsive pixels) or pixels which have a shift in offset value (e.g. a 'white pixel'). This is illustrated in FIG. 8 which shows the output voltage $V_{out}$ in function of time for optical sensors with different operational characteristics. One ideal curve is shown which corresponds with the nominal operation characteristic of the optical sensor. Two additional curves with different gain are shown (Gain_1 and Gain_2). An error can be determined by the controller when the gain drops below Gain_1. In that case the pixel is a non-responsive pixel. Two additional curves with different offset are shown (Offset_1 and Offset 2). An error can be generated by the controller when the offset is higher that Offset_2 or smaller than Offset_1. By doing the averaging over time, single anomalies in the integrated signals caused by changes in the scene can be filtered out.

Another way to analyze the data is to capture a scene with integration time 1 thereby obtaining the first integrated signal, followed by a capture with a second integration time thereby obtaining the second integrated signal. Based on the data of the first capture and the pre-determined characteristics, the expected pixel responses for the second exposure can be predicted and an error signal can be calculated based on the difference for each pixel between the actual measurement values and the predicted values (i.e. by comparing the obtained characteristics with the pre-determined characteristics). Also here the error signals can be averaged over time to reject single outliers caused by scene changes.

By detecting changes in pixel behavior using the methods described above, suspicious pixels can be flagged. This information can be relayed to algorithms processing the data. This way such algorithms can choose to ignore the data from these pixels or perform further analysis on them to check the status.

Additionally the amount of pixels with deviations can be monitored over time and as such can be used as an indicator of the operating status of the image sensor. An increase of deviating pixels can act as a warning about degrading performance of the sensor. This can be used to trigger a diagnostic.

In case of a 3D sensor additionally the distance can be calculated for each of the two exposures. By calculating the difference in depth for each pixel between both exposures, an error signal can be generated. Within normal operating conditions the calculated depth should not depend on integration time or pixel gain. If a difference in depth is detected between both exposures this can indicate faulty circuitry.

In embodiments of the present invention integrated signals are obtained per frame. A frame thereby comprises at least one sequence of resetting the optical sensor, accumulating a signal from the photodetector, and reading the integrated signal. If this sequence is executed a plurality of times, each sequence is referred to as a subframe. In that case several sub-frames are present in a macro-frame (like in multi-phase TOF).

The change in the at least one control parameter (e.g. change in integration time) may be applied at macro-frame level or at sub-frame level. The optical sensor may be diagnosed by checking whether the primary output of the optical sensor is unchanged when changing the control parameter. The primary output is the main output for which the optical sensor is designed. It may for example be the depth of a 3D-camera. This depth should not change for a 3D-camera when changing the integration time.

The control parameter may be fixed or may be changed between sub-frames. As discussed before the control parameter may be the integration time. A fixed set of integration times may be used by the method. These integration times may be stored in a memory of the optical system or they may be retrieved externally. The integration times may be changed randomly between the frames or sub-frames. Alternatively the integration times may be changed repetitively between the frames or sub-frames.

Another control parameter which may be changed between frames or sub-frames is the gain of the optical sensor. Changing this gain results in a change of the conversion slope of the optical sensor. The obtained characteristic as a result of the gain change may be compared with the pre-determined characteristic of a gain change to diagnose the operation of the optical sensor. In this case the optical sensor (which may for example be the pixel of a camera) has a conversion gain which can be changed by the user or autonomously by an application.

An example of such a pixel is illustrated in FIG. 2. It shows an optical sensor 200 which comprises a photodetector 210, an integrator 220, and circuitry connecting the photodetector 210 with the integrator 220. The optical sensor is configured such that a signal from the photodetector can be accumulated on the integrator. The optical sensor 200 comprises a controller 230. This controller is adapted for executing a method in accordance with embodiments of the present invention as disclosed in the previous paragraphs.

In this simplified schematic of FIG. 2 no readout circuitry nor transfer gate is shown for clarity. The signal called 'GAIN' is intended as digital control of the conversion gain. With 'GAIN' being low, only C1 is used as capacitor to integrate the photo-current from the photodiode.

By setting 'GAIN' high, C2 is connected in parallel with C1 and as such the photo-current will be distributed between both capacitors. The change of the conversion gain is depending on the ratio of C1 and C2.

The Reset transistor is only used during reset phase and is not active during integration time or during readout.

In this example the gain of the optical sensor is modifiable by changing the capacitance value that needs to be charged. The invention is, however, not limited thereto. Other implementations for changing the gain are also possible. The gain may for example also be implemented with a variable read-out amplifier gain.

Figure 9:
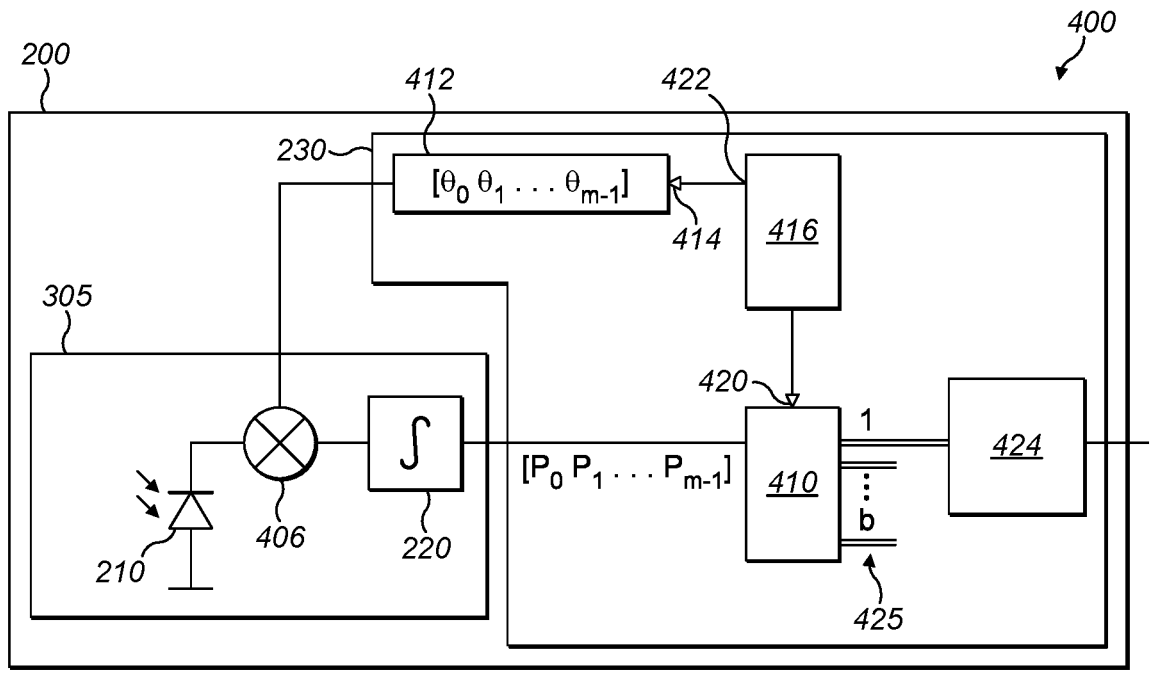
FIG. 9 shows a schematic drawing of an indirect Time-of-Flight system in accordance with embodiments of the present invention.

In a fourth aspect embodiments of the present invention relate to an indirect Time-of-Flight system 400. For an indirect Time-of-Flight (iToF) system diagnostics of the pixels should be done without affecting the frame rate of the output distance information. An exemplary embodiment of such an iTOF system 400, in accordance with embodiments of the present invention, is schematically illustrated in FIG. 9. Such a system may comprise a transmitter for emitting an amplitude modulated light signal to the scene. The modulated signal may be a pulsed signal which has a certain modulation frequency $f_{MOD}$. The iTOF system comprises an optical sensor 200 or a camera in accordance with embodiments of the present invention. The optical sensor comprises a pixel 305 or the camera comprises an array of pixels 305, wherein each pixel comprises a photodetector 210 (e.g. a photodiode), an integrator 220, and circuitry connecting the photodetector 210 with the integrator 220. In the example the pixel 305 comprises a Photonic Mixer Device comprising an integrator 220 and circuitry (the mixer 406) connecting the photodetector with the integrator 220. The integrator comprises two storage elements to which the charge from the photodetector is stored depending on the control signal to the mixer 406.

The optical sensor or camera further comprises a controller 230. The controller 230 comprises reference timing control block 416, phase difference calculation unit 410 and distance calculation unit 424. FIG. 9 shows additionally a phase shifter 412 having an input 414 operationally connected to the output 422 of the timing control block. The phase shifter 412 is further operationally connected to the photodetector 210 to provide control signal to the mixer 406 inside each pixel.

The light emission unit is not shown in FIG. 9, but for generating the required modulated illumination, the timing control block 416 output 422 may be operationally connected to the light emission unit in order to generate the modulating signal for driving a light source. The light source may for instance be a VCSEL or any other suitable light source. The emitted light may pass through an optical system. The optical system may be shared with the photodetector 210 or it may have a separate optical system.

In operation the light emission unit illuminates a scene with the amplitude modulated signal. The returning light, reflected from the objects in the scene, is detected using the one or more pixels 305, in which in each pixel the photodetector 210 generates a current proportional to the detected light. This current is then read to the integrator 220 using a mixer 406. The mixer 406 is configured for receiving a pulse signal which has the same modulation frequency $f_{MOD}$ as the light emission signal. The current generated by the photodetector 210 is modulated with the pulse signal. The pixel 305 may therefore comprise an interface for receiving a signal from the phase shifter 412.

In order to detect the phase difference between the returning light and the emitted light, the mixing signal is phase shifted using a phase shifter 412 to obtain m phase shifted mixing signals (signals $\Theta_0, \Theta_1, \ldots, \Theta_{m-1}$), which results in m integration values P ($P_0, P_1, \ldots, P_{m-1}$, with m a natural number greater than 1, typically between 2 and 8) This phase shifting may be controlled by the controller 230. The iTOF system 400 moreover comprises a calculation unit 410 configured for obtaining the phase difference between the returning light and the emitted light. The calculation unit may for example be a Discrete Fourier Transformation (DFT) block 410, which outputs the harmonic I and Q values 425, where from the first harmonic values the phase difference can be calculated. For that purpose the timing information from timing control block may be required, shown as the arrow 420. From the phase differences between the returning light and the emitted light the distance to the object may be solved using a block 424.

In the following an exemplary implementation of an iToF system in accordance with embodiments of the present invention is further elaborated. In the example m=4, i.e. using phase shifts of 0°, 90°, 1800 and 270° for the mixing signal. In the example the mixer 406 is controlled by a pulse signal with 50% duty cycle (other duty cycles may be possible). Hence, the integration time is defined by the number of pulses for each phase.

Figure 10:
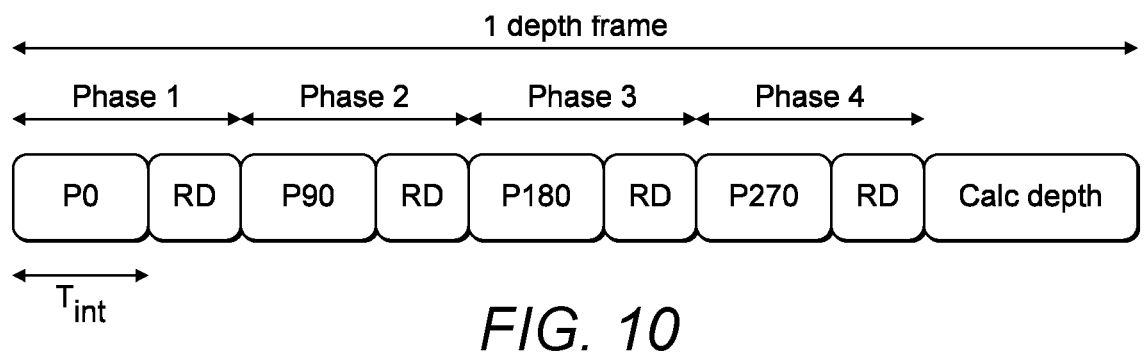
FIG. 10 shows a schematic drawing of a sequence of phases corresponding with one depth frame for a Time-of-Flight system in accordance with embodiments of the present invention.

FIG. 10 shows the four phases of the exemplary iToF system by means of which a distance measurement can be done. This sequence of phases is referred to as one depth frame.

In embodiments of the present invention a control parameter of the optical sensor (e.g. integration time) may be changed for the different depth frames while keeping it constant within a depth frame. Referring to FIG. 10 P0, P90, P180 and P270 would be of a certain length T1 for the first depth frame and would become length T2, different from T1, for a subsequent frame (other sensor parameters may be changed).

In typical circumstances where the time-of-flight is not significantly changing between depth frames, the resulting depth for both depth frames should be substantially equal, independent of the used integration times. Therefore differences between the resulting depths for different depth frames can be used as a first diagnostic value. The controller 230 is thereby adapted for changing at least one control parameter of the optical sensor and for obtaining the resulting depth from the integrated signals.

Additionally the controller may be configured for comparing the phase data itself between depth frames for diagnostic purposes: $P_0$ of the first depth frame with T1 as integration time can be compared to $P_0$ data from the second frame with T2 as value for integration time. The results for each of the phases should scale with the integration time as explained in a previous paragraph.

The invention claimed is:

1. A method for diagnosing an optical sensor which comprises a photodetector and an integrator, the method comprising:
exposing the photodetector to incoming light;
obtaining an initial integrated signal at an initial frame;
at least once executing the steps of changing at least one control parameter of the optical sensor, exposing the photodetector to incoming light, and obtaining one or more subsequent integrated signals at a subsequent frame;
wherein integrated signals are obtained per frame for each pixel, and a frame comprises at least one sequence of resetting the optical sensor and accumulating, during an integration time, a signal from circuitry which connects the photodetector with the integrator, and reading the integrated signal wherein the integrated signal is representative for the amount of incoming light on the photodetector and is a calculated voltage difference between an output voltage before and after the integration time;
obtaining a characteristic of the optical sensor from the obtained integrated signals; and
comparing the obtained characteristic with a pre-determined characteristic of the optical sensor, wherein the pre-determined characteristic is defined in function of the at least one control parameter, to diagnose the optical sensor to detect if a fault is present in each pixel of the optical sensor.

2. The method according to claim 1, wherein at least one control parameter is the integration time.

3. The method according to claim 2, wherein the integration times have a ratio ranging from 50% to 150%.

4. The method according to claim 1, wherein at least one control parameter is the gain of the optical sensor.

5. The method according to claim 1, wherein the integrated signal $V_{out}(t)$ is modelled as $g*t+V_{offset}$, wherein g and $V_{offset}$ are characteristics of the optical sensor which are obtained from the obtained integrated signals.

6. The method according to claim 1, wherein a characteristic of the optical sensor is obtained by dividing subsequent integrated signals.

7. A computer program product for, if implemented on a processing unit, performing the method for diagnosing an optical sensor according to claim 1.

8. An optical sensor, the optical sensor comprising a photodetector, an integrator, and circuitry connecting the photodetector with the integrator such that a signal from the photodetector, or a processed version thereof, can be accumulated on the integrator, the optical sensor comprising a controller configured for:
obtaining an initial integrated signal at an initial frame;
at least once executing the steps of changing at least one control parameter of the optical sensor, and obtaining one or more subsequent integrated signals at a subsequent frame;
wherein integrated signals are obtained per frame for each pixel, and a frame comprises at least one sequence of resetting the optical sensor and accumulating, during an integration time, a signal from the circuitry which connects the photodetector with the integrator, and reading the integrated signal wherein the integrated signal is representative for the amount of incoming light on the photodetector and is a calculated voltage difference between an output voltage before and after the integration time;
obtaining a characteristic of the optical sensor from the obtained integrated signals; and
comparing the obtained characteristic with a pre-determined characteristic of the optical sensor, wherein the pre-determined characteristic is defined in function of the at least one control parameter, to diagnose the optical sensor to detect if a fault is present in each pixel of the optical sensor.

9. The optical sensor according to claim 8, wherein the integrator comprises a plurality of parallel capacitors wherein the controller is configured for connecting or disconnecting one or more of the capacitors of the integrator.

10. The optical sensor according to claim 9, wherein the optical sensor further comprises a gain transistor configured for connecting or disconnecting a capacitor from the plurality of parallel capacitors of the integrator.

11. The optical sensor according to claim 8, wherein the optical sensor further comprises a reset transistor configured for resetting the integrator voltage.

12. An indirect Time-of-Flight system for measuring the time of flight of a modulated optical signal which is reflected on an object, the indirect Time-of-Flight system comprising an optical sensor according to claim 8, for receiving the reflected optical signal, wherein the Time-of-Flight system is configured for obtaining a measure of the time-of-flight and wherein this measure is the characteristic of the optical sensor for diagnosing the optical sensor.

13. The indirect Time-of-Flight system according to claim 12, wherein the circuitry connecting the photodetector with the integrator comprises a mixer configured for mixing a signal from the photodetector with a signal which is phase correlated with the modulated optical signal with such that the mixed signal can be accumulated on the integrator.

14. A camera comprising a plurality of pixels, each pixel comprising a photodetector, an integrator, and circuitry connecting the photodetector with the integrator the camera comprising a controller which is for each of the pixels configured for:
obtaining an initial integrated signal at an initial frame;
at least once executing the steps of changing at least one control parameter of the camera, and obtaining one or more subsequent integrated signals at a subsequent frame;

wherein integrated signals are obtained per frame for each pixel, and a frame comprises at least one sequence of resetting the optical sensor and accumulating, during an integration time, a signal from the circuitry which connects the photodetector with the integrator, and reading the integrated signal wherein the integrated signal is representative for the amount of incoming light on the photodetector and is a calculated voltage difference between an output voltage of the optical sensor before and after the integration time;

obtaining a characteristic of the optical sensor from the obtained integrated signals; and comparing the obtained characteristic with a pre-determined characteristic of the optical sensor, wherein the pre-determined characteristic is defined in function of the at least one control parameter, to diagnose the optical sensor to detect if a fault is present in each pixel of the optical sensor.

15. The camera according to claim 14, wherein the camera is a 3D-camera and wherein the controller is configured for obtaining a pixel depth for each pixel as characteristic of the pixel, and wherein comparing the obtained characteristic with the pre-determined characteristic corresponds with verifying that the pixel depth does not significantly change for each pixel.

* * * * *